United States Patent [19]

Bares

[11] Patent Number: 5,214,471
[45] Date of Patent: May 25, 1993

| | | | |
|---|---|---|---|
| 4,866,481 | 9/1989 | Yamada et al. | 355/246 |
| 4,912,508 | 3/1990 | Zawadzki et al. | 355/208 |
| 5,025,480 | 6/1991 | Morton et al. | 358/464 X |

[54] BACKGROUND MONITORING DEVICE

[75] Inventor: Jan Bares, Webster, N.Y.

[73] Assignee: Xerox Corporation, Stamford, Conn.

[21] Appl. No.: 355,715

[22] Filed: May 22, 1989

[51] Int. Cl.$^5$ .......................................... G03G 21/00
[52] U.S. Cl. ...................................... 355/203; 355/208
[58] Field of Search ............... 355/208, 209, 246, 214, 355/316, 203, 311

[56] References Cited

U.S. PATENT DOCUMENTS

| | | | |
|---|---|---|---|
| 4,050,806 | 9/1977 | Miyakawa | 355/208 |
| 4,087,171 | 5/1978 | Yano | 355/246 |
| 4,372,672 | 2/1983 | Pries | 355/208 X |
| 4,377,338 | 3/1983 | Ernst | 355/246 |
| 4,466,732 | 8/1984 | Folkins | 355/251 |
| 4,519,695 | 5/1985 | Murai et al. | 355/246 |
| 4,563,086 | 1/1986 | Knapp et al. | 355/246 |
| 4,607,944 | 8/1986 | Rushing | 355/246 |
| 4,655,582 | 4/1987 | Okuda et al. | 355/319 |
| 4,786,924 | 11/1988 | Folkins | 355/208 |
| 4,831,410 | 5/1989 | Adams et al. | 355/246 X |

FOREIGN PATENT DOCUMENTS

| | | | |
|---|---|---|---|
| 0159664 | 10/1982 | Japan | 355/208 |
| 0049351 | 3/1985 | Japan | 355/208 |
| 0247659 | 12/1985 | Japan | 355/208 |
| 0115473 | 5/1987 | Japan . | |
| 0155057 | 6/1988 | Japan | 355/209 |

*Primary Examiner*—A. T. Grimley
*Assistant Examiner*—Robert Beatty
*Attorney, Agent, or Firm*—H. Fleischer; J. E. Beck; R. Zibelli

[57] ABSTRACT

An apparatus in which background density of a sheet having visible indicia is monitored. A region of the sheet is scanned and a signal is generated corresponding to the scanned region. The signal corresponding to the scanned region is processed and a signal corresponding to the background density of the sheet is generated.

2 Claims, 3 Drawing Sheets

BACKGROUND MONITORING DEVICE

This invention relates generally to an apparatus for monitoring background density of a sheet having visible indicia thereon, and more particularly concerns an electrophotographic printing machine in which a developed image is fused to a sheet and the background thereof is monitored.

Generally, the process of electrophotographic printing includes charging a photoconductive member to a substantially uniform potential so as to sensitize the surface thereof. The charged portion of the photoconductive surface is exposed to a light image of an original document being reproduced. This records an electrostatic latent image on the photoconductive surface. After the electrostatic latent image is recorded on the photoconductive surface, the latent image is developed by bringing a developer mixture into contact therewith. A common type of developer comprises carrier granules having toner particles adhering triboelectrically thereto. This two-component mixture is brought into contact with the photoconductive surface. The toner particles are attracted from the carrier granules to the latent image. This forms a toner powder image on the photoconductive surface which is subsequently transferred to a copy sheet. However, in addition to forming a toner powder image on the photoconductive member corresponding to the information contained in the original document, additional toner particles are deposited in the non-image, background, areas. The toner particles in the background area are also transferred to the copy sheet. Finally, the toner powder image and the background toner particles are heated to permanently fuse them to the copy sheet. Ideally, no background toner particles are present on the copy sheet. However, in actual practice toner particles are fused to the copy sheet in the background area.

Users of electrophotographic printing machines request servicing of the printing machine when the background level on the copy becomes unacceptable. This requires that a service representative go to the site of the machine and analyze the cause of the high background. The cause of the high background is traced to one or more of the processing stations in the printing machine and corrected. When the operator is the first to detect high background, the perception of the printing machine reliability is compromised. Moreover, high background results in unscheduled maintenance calls by the service representative resulting in increased maintenance costs. Preferably, it is desirable to correct high background problems before they are perceived by the operator as part of scheduled maintenance calls by the service representative. This requires that the background of the copy sheet be monitored. When the background exceeds a pre-determined level, either the processing stations of the printing machine are adjusted to correct this condition and/or the service representative notified to correct this problem. In this way, the background on the copy sheet is prevented from reaching a level wherein it is perceived as being a problem by the machine operator. Various approaches have been devised to control the background, the following disclosures appear to be relevant:

U.S. Pat. No. 4,050,806; Patentee: Miyakawa et al.; Issued: Sep. 27, 1977.

U.S. Pat. No. 4,087,171; Patentee: Yano; Issued: May 2, 1978.

U.S. Pat. No. 4,377,338; Patentee: Ernst; Issued: Mar. 22, 1983.

U.S. Pat. No. 4,466,732; Patentee: Folkins; Issued: Aug. 21, 1984.

The relevant portions of the foregoing disclosures may be briefly summarized as follows:

U.S. Pat. No. 4,050,806 discloses measuring the voltage corresponding to the background portions of an original document and computing and applying a biasing voltage to a developing electrode as a predetermined function of the measured potential. The background area measured may be formed by a white reference document disposed adjacent to the original document. Alternatively, a plurality of portions of the electrostatic latent image are sensed and the lowest value of the sensed potential is used as a measure of the background.

U.S. Pat. No. 4,087,171 describes a technique for improving contrast by sensing the electrostatic potential of the background area of the electrostatic image and controlling the voltage source in accordance therewith. The biasing voltage is limited to a first upper limit or a higher second upper limit. In order to improve the reproduction of low contrast documents, the exposure intensity is reduced to a value at which the difference in brightness of the light and dark areas of the document will produce a maximum difference in electrostatic potential on the photoconductor. For normal documents, the biasing voltage is limited to the first upper limit. For low contrast, low density documents, the biasing voltage is limited to the second upper limit to prevent darkening of the light areas of the copy. For documents having low contrast and large dark areas, the biasing voltage is limited to the upper limit so that the dark areas will be reproduced with high density.

U.S. Pat. No. 4,377,338 discloses imaging a test pattern onto a photoconductor by controlling illumination levels in a series of steps. The light reflectance from the test pattern is detected and compared to maximum black and white criteria for storage. Light reflected from cleaned photoconductor areas and toner patches are compared against the original test pattern reflectance data. Toner replenishment, controls and machine function monitoring are based on these recorded standards from the test pattern.

U.S. Pat. No. 4,466,732 describes a developer roller in which the charge induced thereon by the photoconductor is controlled to electrically bias the developer roll to a potential intermediate the potential of the image and background regions on the photoconductor.

In accordance with one aspect of the present invention, there is provided an apparatus for monitoring background density of a sheet having visible indicia thereon. Means are provided for scanning a region of the sheet and generating a signal corresponding to the scanned region. Means, responsive to the signal from the scanning means, generate a signal corresponding to the background density of the sheet.

Pursuant to another aspect of the present invention, there is provided an electrophotographic printing machine of the type in which an image developed on a photoconductive member is transferred to a sheet and fused thereto. The improvement includes means for scanning a region of the sheet and generating a signal corresponding to the scanned region. Means, responsive to the signal from said scanning means, generate a signal corresponding to the background density of the sheet.

Other features of the present invention will become apparent as the following description proceeds and upon reference to the drawings, in which.

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Inasmuch as the art of electrophotographic printing is well known, the various processing stations employed in the FIG. 1 printing machine will be shown hereinafter schematically and their operation described briefly with reference thereto.

Figure 1:
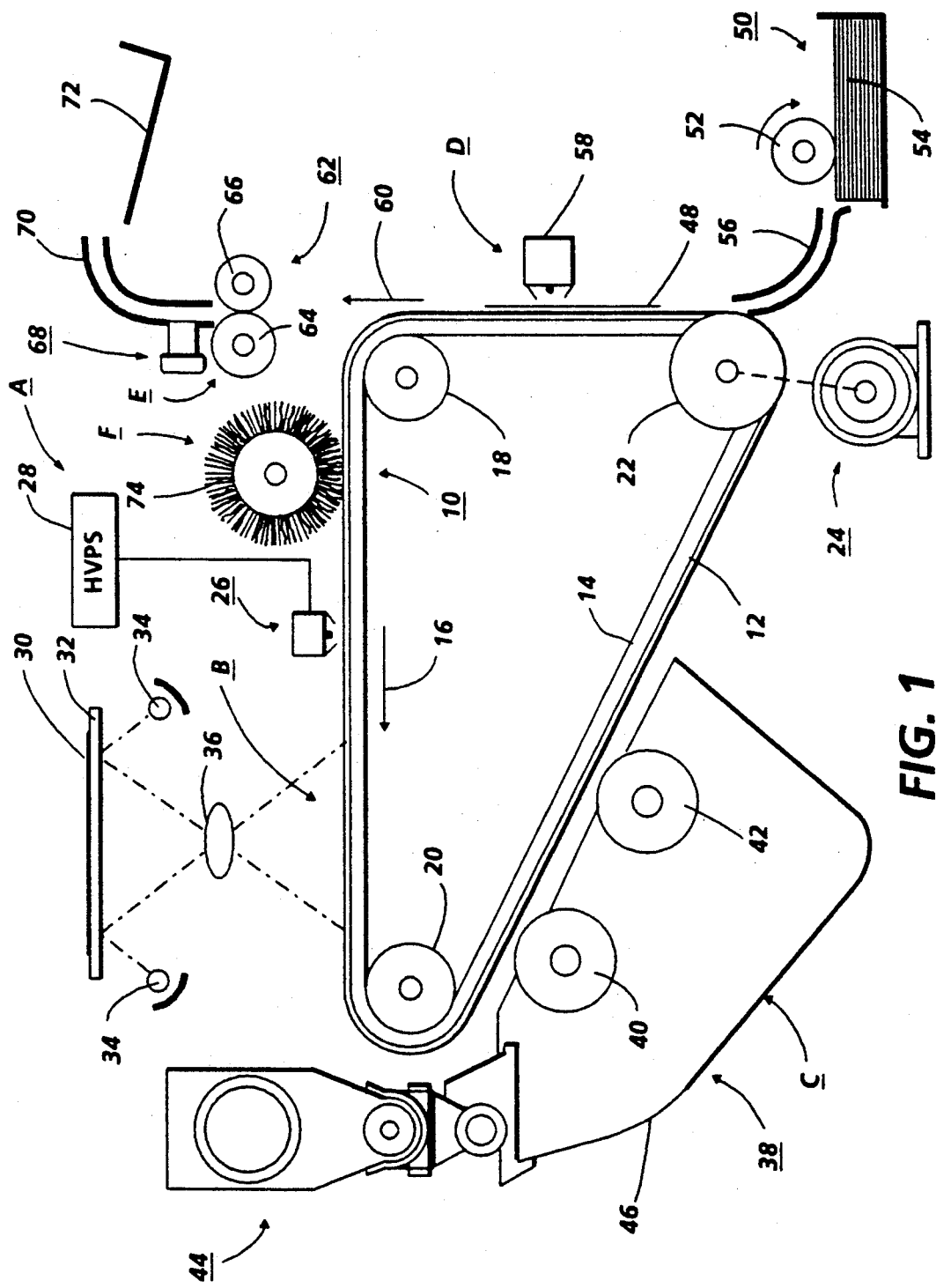
FIG. 1 is a schematic elevational view of an illustrative electrophotographic printing machine incorporating a background monitoring apparatus of the present invention therein.

Referring now to FIG. 1, the electrophotographic printing machine employs a belt 10 having a photoconductive surface 12 deposited on a conductive substrate 14. Preferably, photoconductive surface 12 is made from a selenium alloy. Conductive substrate 14 is made preferably from an aluminum alloy which is electrically grounded. Belt 10 moves in the direction of arrow 16 to advance successive portions of photoconductive surface 12 sequentially through the various processing stations disposed about the path of movement thereof. Belt 10 is entrained about stripping roller 18, tensioning roller 20 and drive roller 22. Drive roller 22 is mounted rotatably in engagement with belt 10. Motor 24 rotates roller 22 to advance belt 10 in the direction of arrow 16. Roller 22 is coupled to motor 24 by suitable means, such as a drive belt. Belt 10 is maintained in tension by a pair of springs (not shown) resiliently urging tensioning roller 20 against belt 10 with the desired spring force. Stripping roller 18 and tensioning roller 20 are mounted to rotate freely.

Initially, a portion of belt 10 passes through charging station A. At charging station A, a corona generating device, indicated generally by the reference numeral 26 charges photoconductive surface 12 to a relatively high, substantially uniform potential. High voltage power supply 28 is coupled to corona generating device 26. Excitation of power supply 28 causes corona generating device 26 to charge photoconductive surface 12 of belt 10. After photoconductive surface 12 of belt 10 is charged, the charged portion thereof is advanced through exposure station B.

At exposure station B, an original document 30 is placed face down upon a transparent platen 32. Lamps 34 flash light rays onto original document 30. The light rays reflected from original document 30 are transmitted through lens 36 to form a light image thereof. Lens 36 focuses this light image onto the charged portion of photoconductive surface 12 to selectively dissipate the charge thereon. This records an electrostatic latent image on photoconductive surface 12 which corresponds to the informational areas contained within original document 30.

After the electrostatic latent image has been recorded on photoconductive surface 12, belt 10 advances the latent image to development station C. At development station C, a magnetic brush development system, indicated by the reference numeral 38, advances developer material into contact with the latent image. Preferably, magnetic brush development system 38 includes two magnetic brush developer rollers 40 and 42. Rollers 40 and 42 advance developer material into contact with the latent image. These developer rollers form a brush of carrier granules and toner particles extending outwardly therefrom. The latent image attracts toner particles from the carrier granules forming a toner powder image thereon. As successive electrostatic latent images are developed, toner particles are depleted from the developer material. A toner particle dispenser, indicated generally by the reference numeral 44, dispenses toner particles into developer housing 46 of developer unit 38.

With continued reference to FIG. 1, after the electrostatic latent image is developed, belt 10 advances the toner powder image to transfer station D. A copy sheet 48 is advanced to transfer station D by sheet feeding apparatus 50. Preferably, sheet feeding apparatus 50 includes a feed roll 52 contacting the uppermost sheet of stack 54. Feed roll 52 rotates to advance the uppermost sheet from stack 54 into chute 56. Chute 56 directs the advancing sheet of support material into contact with photoconductive surface 12 of belt 10 in a timed sequence so that the toner powder image formed thereon contacts the advancing sheet at transfer station D. Transfer station D includes a corona generating device 58 which sprays ions onto the back side of sheet 48. This attracts the toner powder image from photoconductive surface 12 to sheet 48. After transfer, sheet 48 continues to move in the direction of arrow 60 onto a conveyor (not shown) which advances sheet 48 to fusing station E.

Fusing station E includes a fuser assembly, indicated generally by the reference numeral 62, which permanently affixes the transferred powder image to sheet 48. Fuser assembly 60 includes a heated fuser roller 64 and a back-up roller 66. Sheet 48 passes between fuser roller 64 and back-up roller 66 with the toner powder image contacting fuser roller 64. In this manner, the toner powder image is permanently affixed to sheet 48. After fusing, sheet 48 advances through chute 70. As sheet 48 advances through chute 70, a background monitor, indicated generally by the reference numeral 68, detects the level of background on the copy sheet and transmits a signal indicating the status thereof to the control logic. The background on the copy sheet appears usually over the entire surface of the copy sheet and only a small portion of the copy sheet area needs to be monitored to detect background level. Generally, background is discrete, never consisting of large particle aggregates. In contrast, even narrow lines and fine print, including dots and commas represent relatively large connected objects. Simple pattern recognition algorithms can be used to distinguish between the image and background. Consequently, background can be monitored even in the case where the detected image cannot be compared with the original bit image received by the raster input scanner (RIS). The image scanned by the background monitor is processed by eliminating the large black areas as these are part of the legitimate image and then counting the remaining objects and time or space averaging. The result is then compared against a threshold.

Alternatively, a simplified Fourier analysis of the image can be used since the spectra of the background can be expected to have a different form than the spectra of most images and text. In this way, the selected portion of the spectra or their functions, i.e. ratio, can be compared against an appropriate threshold value to determine whether their is an objectionable level of background on the copy sheet. Preferably, background monitor 68 is an inexpensive RIS. A suitably designed RIS which will function as a background monitor is shown in FIG. 3 and will be described hereinafter with reference thereto. Further details of the control system associated with background monitor 68 will be discussed with reference to FIG. 2. With continued reference to FIG. 1, chute 70 advances sheet 48 to catch tray 72 for subsequent removal from the printing machine by the operator.

After the copy sheet is separated from photoconductive surface 12 of belt 10, the residual toner particles adhering to photoconductive surface 12 are removed therefrom at cleaning station F. Cleaning station F includes a rotatably mounted fibrous brush 74 in contact with photoconductive surface 12. The particles are cleaned from photoconductive surface 12 by the rotation of brush 74 in contact therewith. Subsequent to cleaning, a discharge lamp (not shown) floods photoconductive surface 12 with light to dissipate any residual electrostatic charge remaining thereon prior to the charging thereof for the next successive imaging cycle.

It is believed that the foregoing description is sufficient for purposes of the present application to illustrate the general operation of an electrophotographic printing machine incorporating the features of the present invention therein.

Figure 2:
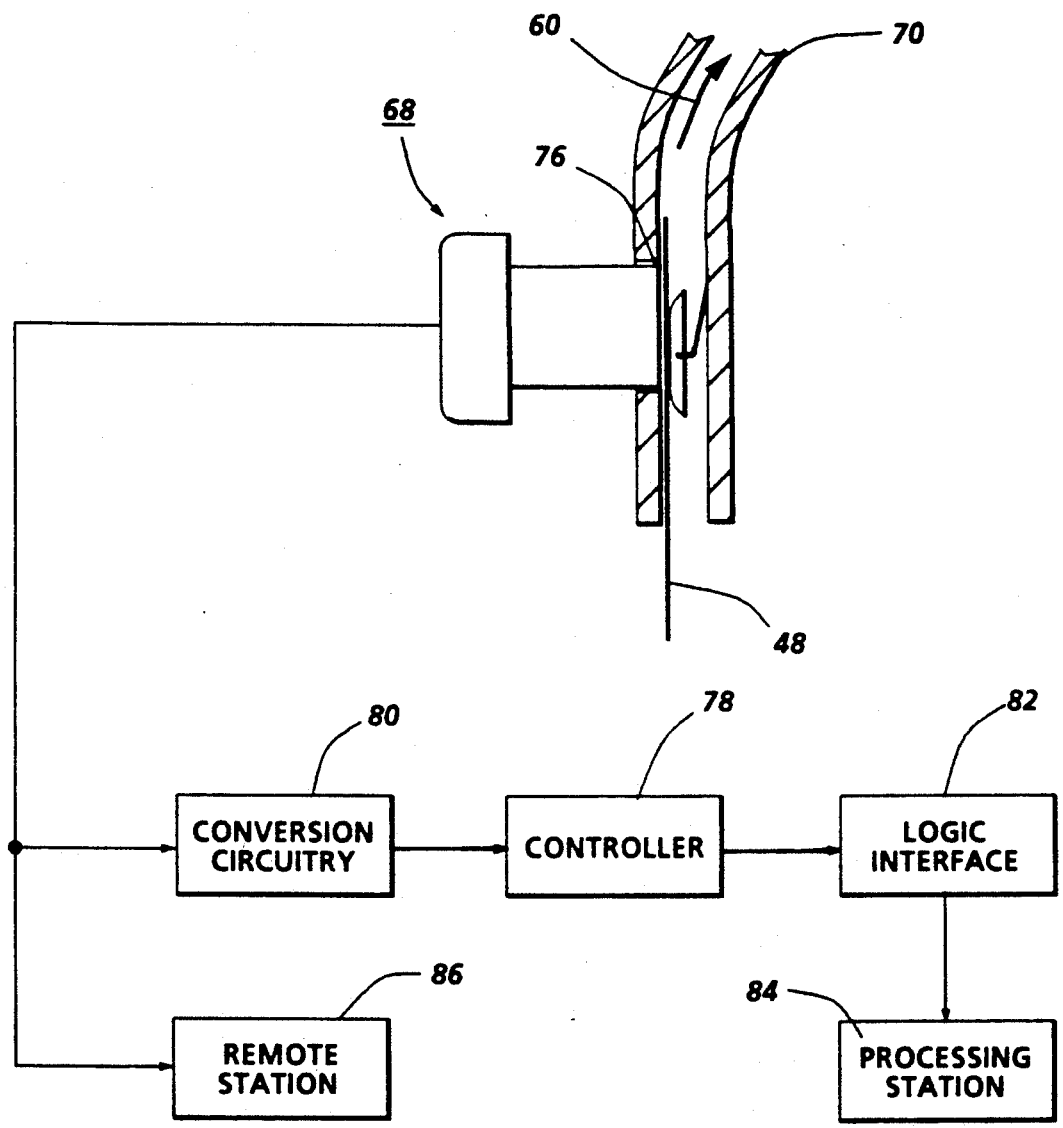
FIG. 2 is a block diagram illustrating the control system regulating the various processing stations in the printing machine as a function of the signal from the background monitoring apparatus.
Figure 3:
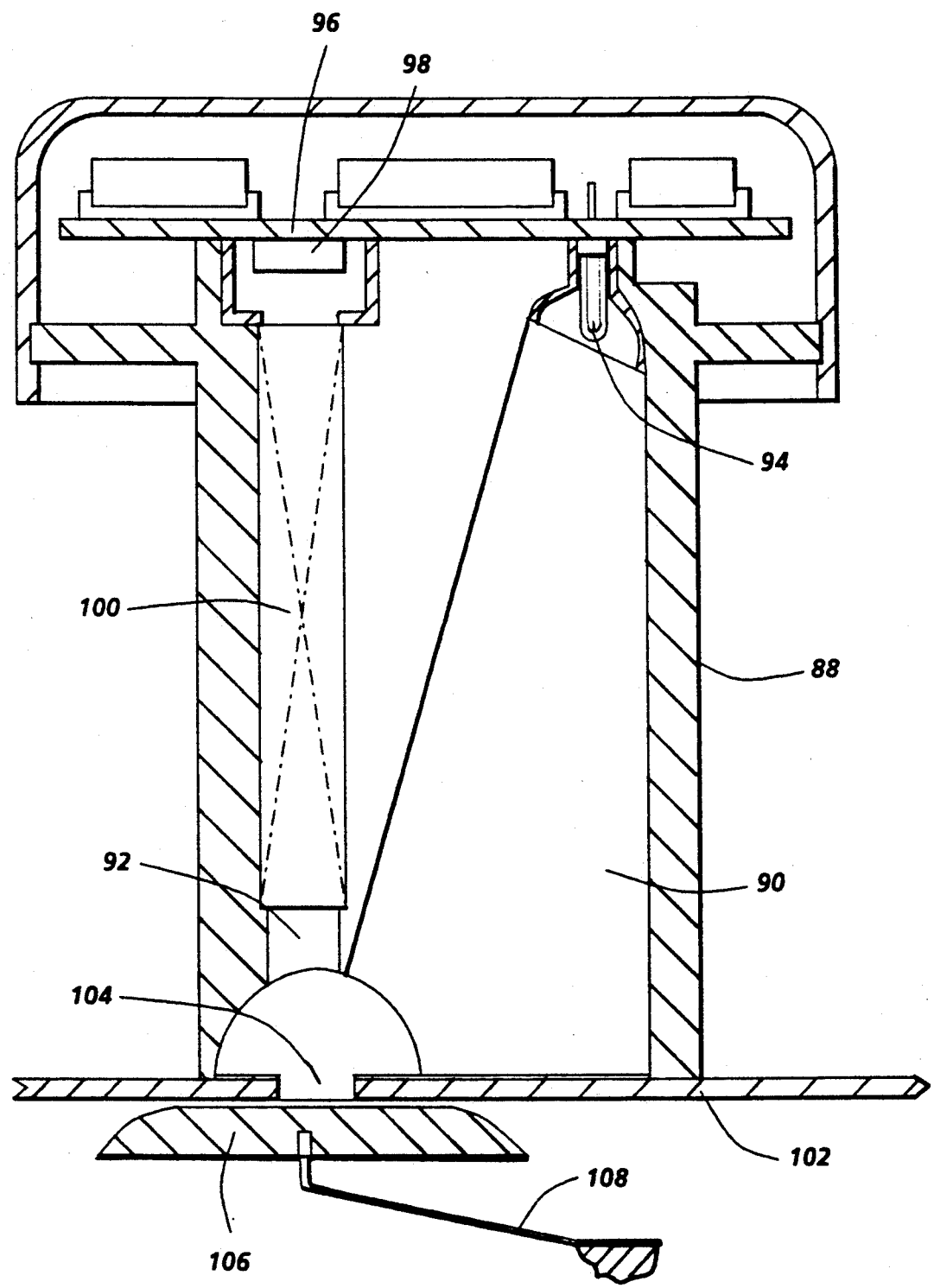
FIG. 3 is schematic elevational view showing the details of the FIGS. 1 and 2 background monitoring apparatus.

Referring now to FIG. 2, there is shown background monitor 68 detecting the background level on sheet 48. Chute 70 has a side wall with an aperture 76 therein in which background monitor 68 is mounted. Background monitor 68 detects the density of the background on copy sheet 48 after the developed image has been fused thereon and produces an electrical output signal indicative thereof. Thus, background monitor 68 generates an electrical output signal proportional to the background on sheet 48. This signal is conveyed to controller 78 through suitable conversion circuitry 80. Controller 78 converts the signals received from background monitor 68 into a signal indicative of the background of sheet 48 and compares this signal to a reference so as to generate an error signal. The error signal is transmitted to logic interface 82 which processes the error signal so that it controls the respective processing station 84. For example, if the charging station is the processing station being controlled, the logic interface transmits the error signal in the appropriate form to the high voltage power supply to regulate charging of the photoconductive surface. When toner concentration is being controlled, toner dispenser 44 (FIG. 1) is energized to discharge toner particles into developer housing 46. This increases the concentration of toner particles in the developer mixture. During operation of the electrophotographic printing machine, any of the selected processing stations can be simultaneously controlled by the control loop depicted in FIG. 2. For example, in addition to controlling charging and toner concentration, the electrical bias applied to the developer roller may also be regulated or the intensity of illumination by lamp 34 can be controlled. By regulating a plurality of processing stations, larger variations from the nominal conditions and faster returns to the nominal conditions are possible. In this manner, the various printing machine processing stations have wider latitude. Alternatively, the signal from background monitor 68 may be transmitted over telephone lines to a remote station 86. Remote station 86 may be a computer facility adapted to receive signals from a multiplicity of background monitors on different machines for processing. The remote station processes these signals and projects which machines will require a service call in the future. A service representative is then dispatched to the machine to service the machine and correct the cause of the high background level prior to the machine operator observing excessive background on the sheet. In this way, the perceived reliability of the printing machine is maintained at a high level and unscheduled maintenance calls are reduced.

Turning now to FIG. 3, there is shown the background monitor in greater detail. As depicted thereat, the background monitor includes a housing 88 having chambers 90 and 92 therein. Preferably, housing 88 is made from a molded plastic body with the walls of chamber 90 being white or reflecting. A light source or light bulb 94 is mounted in the upper end of chamber 90. By way of example, light bulb 94 may be krypton mini light bulb. Light bulb 94 is connected to printed circuit board 96. Printed circuit board 96 is mounted on the upper end of housing 88. A 256 bit wide scanner chip 98 is mounted on printed circuit board 96 in the upper end of chamber 92. The scanner chip may be a charge coupled device (CCD array). A lens 100 is mounted in chamber 92 between scanner chip 96 and baffle plate 102. Baffle plate 102 has an aperture 104 therein aligned with lens 100. Preferably, lens 100 has a total conjugate length of 65 millimeters and a depth of focus of from 0.5 to 0.2 millimeters. The scanner chip can be focused on a width of about 2.56 millimeters which permits detection of fused toner particles having a size on the order of about 10 micrometers. A plate 106 is mounted on one end of a leaf spring 108. The other end of leaf spring 108 is mounted on a wall of chute 70. Plate 106 is opposed from aperture 104 in plate 102. Plate 102 and plate 104 define a gap through which sheet 48 passes. Spring 106 resiliently urges plate 106 toward plate 102 so as to position sheet 48 there against as it passes aperture 104. The surface of plate 106 opposed from aperture 104 is white. In operation, the white surface illumination reference level can be set in the interdocument zone, i.e. between sheets, by measuring the reflected light from the white surface of plate 106. The dark reference level can be obtained by de-energizing light source 94. Thus, the output from scanner chip 98 when the light source is de-energized corresponds to the dark reference level and the output between sheets corresponds to the white surface illumination reference level. The detected light intensity is averaged over all of the pixels to set the threshold. Alternatively, the dark reference level and the white reference level can be obtained by averaging the light output over the background and solid areas. Thus, as the sheet passes beneath the aperture, the background monitor will detect solid areas and white or blank spaces on the copy sheet. The highest intensity level, i.e. for blank or white spaces, corresponds to the white reference level and the lowest intensity level for solid areas or thick lines corresponds to the dark reference level. The white reference level can be set accurately since the information is being integrated over the area of the sheet independent of the background thereon.

In recapitulation, it is evident that a raster input scanner using a CCD array may be employed as a background monitor to provide information as to the level of background on a sheet having a fused image thereon. The signal from the monitor is processed and compared to a threshold level. The resulting error signal may be used to control at least one of the processing stations in the printing machine. In addition, or alternatively, the signal from the background monitor may be transmitted over telephone lines to a station located remotely from the printing machine. The remotely located station may use a computer facility to process the signal to predict when the background level will reach an unacceptable level. In this way, a service representative may be sent to the printing machine location in a timely manner to repair the cause of the background problem before the machine operator perceives that the background has reached an unacceptable level. This improves operator perceived reliability and reduces unscheduled maintenance of the printing machine.

It is, therefore, apparent that there has been provided in accordance with the present invention, a background monitor for use in an electrophotographic printing machine that fully satisfies the aims and advantages hereinbefore set forth. While this invention has been described in conjunction with a specific embodiment thereof, it is evident that many alternatives, modifications, and variations will be apparent to those skilled in the art. Accordingly, it is intended to embrace all such alternatives, modifications and variations that fall within the spirit and broad scope of the appended claims.

I claim:

1. An electrophotographic printing machine of the type in which an image developed on a photoconductive member is transferred to a sheet and fused thereto, wherein the improvement includes:

means for scanning a region of the sheet and generating a signal corresponding to the scanned region, said scanning means includes a light source for illuminating the sheet, a lens for receiving the light rays reflected from the sheet, and a scanner chip positioned to have the light rays transmitted through said lens focused thereon, said scanning means obtaining a first reference signal by measuring the intensity of light rays reflected from a blank portion of the sheet and a second reference signal by measuring the intensity of light rays reflected from the image fused to the sheet, said scanning means includes a housing having a first chamber with said light source mounted therein and a second chamber having said lens and said scanner chip mounted therein, said housing of said scanning means includes a wall having an aperture aligned with one side of said lens with said scanner chip being aligned with the other side of said lens;

means, responsive to the signal from said scanning means, for generating a signal corresponding to the background density of the sheet;

a plate adjacent the wall of said housing defining a gap therebetween through which the sheet passes; and means for resiliently urging said plate toward the wall of said housing to press the sheet against the wall in the region of the aperture therein.

2. An electrophotographic printing machine of the type in which an image developed on a photoconductive member is transferred to a sheet and fused thereto, wherein the improvement includes:

means for scanning a region of the sheet and generating a signal corresponding to the scanned region, said scanning means includes a light source for illuminating the sheet, a lens for receiving the light rays reflected from the sheet, and a scanner chip positioned to have the light rays transmitted through said lens focused thereon, said scanning means obtaining a first reference signal by measuring the intensity of light reflected thereto between successive sheets and a second reference signal by de-energizing said light source, said scanning means includes a housing having a first chamber with said light source mounted therein and a second chamber having said lens and said scanner chip mounted therein, said housing of said scanning means includes a wall having an aperture aligned with one side of said lens with said scanner chip being aligned with the other side of said lens;

means, responsive to the signal from said scanning means, for generating a signal corresponding to the background density of the sheet;

a plate adjacent the wall of said housing defining a gap therebetween through which the sheet passes; and means for resiliently urging said plate toward the wall of said housing to press the sheet against the wall in the region of the aperture therein.

* * * * *